(No Model.)
T. L. STURTEVANT & W. H. ELLIS.
MILLSTONE AND METHOD OF MAKING THE SAME.
No. 483,504. Patented Sept. 27, 1892.
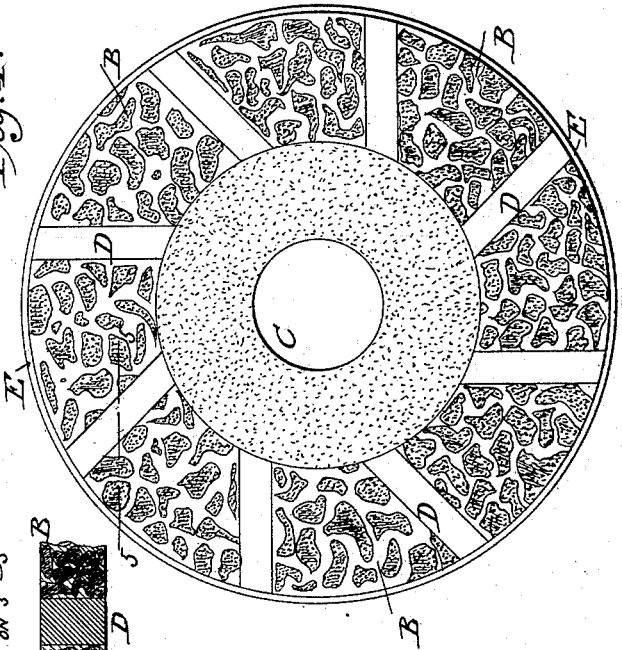
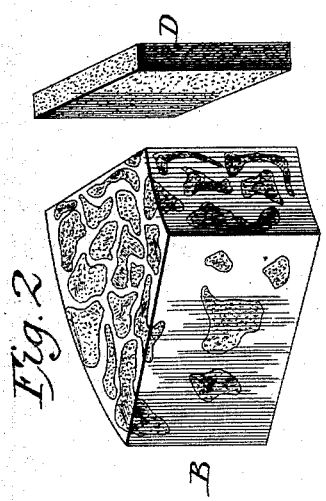
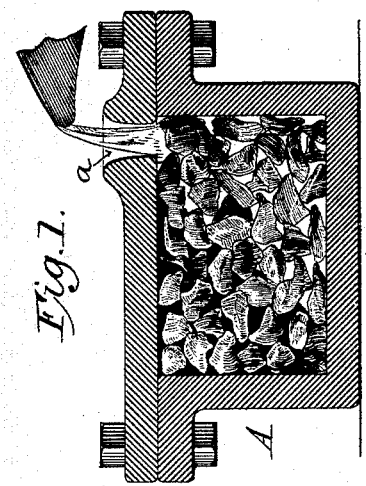
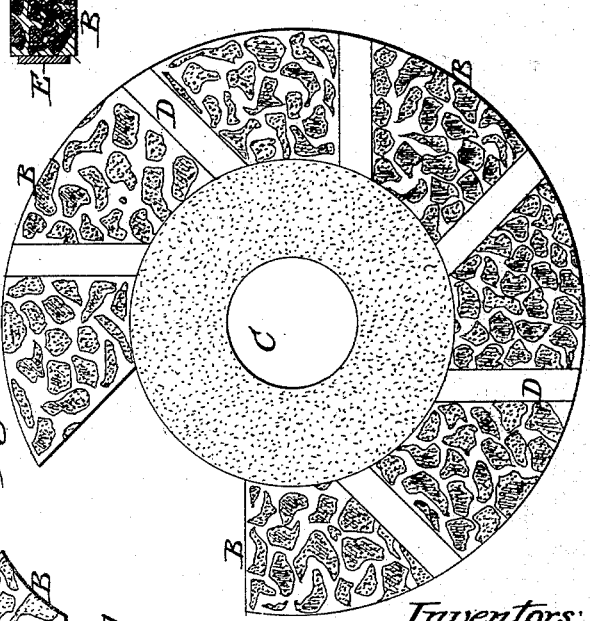
Witnesses:
Sidney P. Hollingworth
B. W. Miller
Inventors:
Thomas L. Sturtevant,
William H. Ellis,
by their attorneys,
Baldwin Davidson Wight

UNITED STATES PATENT OFFICE.

THOMAS L. STURTEVANT, OF FRAMINGHAM, AND WILLIAM H. ELLIS, OF BOSTON, MASSACHUSETTS.

MILLSTONE AND THE METHOD OF MAKING THE SAME.

SPECIFICATION forming part of Letters Patent No. 483,504, dated September 27, 1892.

Application filed May 5, 1892. Serial No. 431,928. (No model.)

*To all whom it may concern:*

Be it known that we, THOMAS L. STURTEVANT, residing at Framingham, in the county of Middlesex, and WILLIAM H. ELLIS, residing at Boston, in the county of Suffolk, State of Massachusetts, citizens of the United States, have invented certain new and useful Improvements in Millstones and in the Method of Making Them, of which the following is a specification.

Our invention relates to composite millstones made up of small irregular lumps of emery united by binding material, such as Portland cement or metal. Millstones of this character are shown in Letters Patent of the United States No. 406,954, granted to C. J. Potter July 16, 1889, and in Patents Nos. 452,958 and 452,959, granted to Thomas L. Sturtevant May 26, 1891. The millstones shown in these patents were a radical departure from millstones as previously made and they embodied marked improvements over all other millstones. By the use of lumps of emery as distinguished from grains or very large blocks and by isolating the lumps from each other in a mass of binding material and distributing them throughout it the millstone is made to have a self-renewing face, presenting "lands" and also furrows continuous from eye to skirt for the escape of the reduced material. The Potter patent above referred to suggests only the use of cement, such as Portland cement. The patents to Sturtevant of May 26, 1891, suggest the use of molten iron, which constitutes a marked improvement on the use of cement, as the iron in cooling grasps the lumps firmly and holds them securely against the strain to which they are subjected. The iron is also less liable to crack or break into fragments and wears more evenly.

In the manufacture of the millstones shown in the patents to Sturtevant above referred to we have discovered, however, that the molten cast-iron employed has such a high temperature that the lumps of emery are always injured and often burned to such an extent as to greatly impair their efficiency. We find, also, that, while molten iron is much superior to Portland cement, it is somewhat too hard. Sometimes, however, lumps of emery will loosen, and where cast-iron is employed it is so hard that it cannot be consolidated about the pieces of emery. It is also difficult (practically impossible) to change or dress the face of the iron after the stone is once made. We have therefore sought to obviate the objections to the Potter and Sturtevant millstones above referred to, and we do this by employing in place of iron a metal melting at a lower temperature than iron or cast-iron. We have attained the best results with zinc; but we do not wish to be limited to the use of zinc, but consider as within the scope of our invention the use of any molten metal melting at a lower temperature than that of cast-iron, as we find that by the use of such a metal the heat is not so great as to injure or impair the lumps of emery employed.

We construct the skirt of the millstone of lumps of emery and molten metal—such as zinc—and may form the eye and the furrows in any suitable way. By the use of metal—such as zinc or lead—we can utilize their malleability, as the metal after the stone is made can be pounded down about the lumps or pieces of emery should they loosen. Metal of this character can also be changed or dressed when necessary.

Should a block or lump of emery become separated from the stone, a new block may be inserted in its place by first heating the metal, inserting the stone, and pouring in fresh metal, which if it does not immediately attach itself to the body of the stone can be caused to join it by a soldering-iron or by a gas-jet, which will melt the two surfaces and cause them to run together.

The accompanying drawings show one form of millstone in which our invention is embodied, and also illustrate the process of forming the stone.

Figure is a detail view in section of a mold in which the skirt-sections are separately formed. Fig. 2 is a perspective view of a skirt-section and a furrow-strip. Fig. 3 is a plan view of a millstone with one of the skirt-sections and two of the furrow-strips separated from the others. Fig. 4 is a plan view of the completed stone. Fig. 5 is a section on the line 5 5 of Fig. 4.

We will describe one specific way of carrying out our invention, but do not wish to limit ourselves to it, the scope and extent of our invention being designated in the claims at the end of this specification.

Before proceeding to a detailed description of the drawings we would say that lumps of emery possess great advantages over all other grinding agents known. The problem has been how to secure the lumps together by a suitable binding material. We have tried slag, lead, antimony, lead hardened with antimony, and cast-iron, and have finally tried zinc. In the choice of metals several things are to be considered, such as cost, the softness or hardness, the weight of the metals, and their melting-point.

We give below the relative weights of several metals: cast-iron, per cubic inch, .261; lead, per cubic inch, .410; zinc, per cubic inch, .248; antimony, per cubic inch, .244; tin, per cubic inch, .264; emery, per cubic inch, .144.

Melting-points: tin, 446° Fahrenheit; lead, 608° Fahrenheit; zinc, 680° Fahrenheit; antimony, 810° Fahrenheit; cast-iron, 2,000° Fahrenheit to 2,500° Fahrenheit.

As before remarked, the use of a metal—such as cast-iron—melting at a high point is undesirable and practically unusable for the reason that it has such a harmful effect upon the emery as to often rot it and make it crumble. Lead is too heavy and too soft. Tin is too expensive. Zinc, so far as we have yet discovered, is the best metal to use for the above as well as for other reasons which might be mentioned. We shall therefore describe zinc as the metal employed in forming our improved millstone, but intend to claim as our invention the use not only of zinc, but other metals melting at a low temperature and possessing the requisite malleability.

In carrying out our invention we fill a mold A, of suitable shape, such as shown in Fig. 1, with small irregular lumps or blocks of emery, usually varying in size from one to two inches in diameter. After the mold is thus filled with the lumps of emery we pour in through a suitable opening $a$ the molten metal—such as zinc—until the interstices between the lumps are filled and a segmental block, such as shown at B in Fig. 2, is formed.

The eye C of the stone, Figs. 3 and 4, may be formed of burr-stone, Esopus stone, metal, or other suitable material. Between the skirt-segments B are interposed furrow-strips D, preferably of zinc or such metal, or they may be of iron, stone, or other suitable material. The eye, skirt-segments, and furrow-strips when assembled may be firmly bound together by a band or hoops E. The skirt, composed of lumps of emery and zinc, may be made in any suitable way. It need not necessarily be made in sections. The furrow-strips may be differently arranged. Separate furrow-strips may be omitted and suitable furrows formed in the skirt.

In a millstone constructed in accordance with our invention the grinding material is generally firmly embedded and grasped. When not firmly grasped, the yielding and malleable character of the soft metal used permits of its being pounded down about the emery, which it then securely holds. The wearing of the eye coincidentally with that of the skirt is insured, and the proper dressing of the stone is facilitated.

The stone-eye is made of a material softer than the emery of the skirt, because as the skirt traverses a greater distance in a given time than the eye it does more work and would wear more quickly unless it were made harder to resist this wear. By our invention these conditions are compensated and provided for, so that a uniform wear of all parts of the stone is insured.

Should it be necessary, the stones can be cut down to compensate for any difference of wear. This was impossible where a cast-iron binding material was employed.

We claim as our invention—

1. The herein-described improvement in the art of making millstones, which consists in forming the skirt of the stone by binding together small irregular lumps or blocks of emery with molten metal melting at a comparatively-low temperature and then securing the skirt to a suitable eye.

2. The herein-described improvement in the art of making millstones, which consists in forming a number of segments for the skirt of small irregular lumps of emery and molten metal—such as zinc—melting at a comparatively-low temperature, arranging the segments around an eye, and securing them thereto, substantially as set forth.

3. The herein-described improvement in the art of making millstones, which consists in forming a number of segments by binding together small irregular lumps of emery with zinc, arranging the segments with furrow-strips around an eye, and securing them thereto.

4. The millstone herein described, comprising a skirt having a working surface composed of small irregular lumps or blocks of emery embedded in, firmly grasped, and held apart by molten metal which melts at a comparatively-low temperature, as set forth.

5. The herein-described millstone, comprising a skirt having a working face composed of small irregular lumps of emery embedded in a molten metal which melts at a comparatively-low temperature, as described, an eye of a different material, and furrow-strips interposed between the skirt-segments.

6. A millstone having a skirt with its working face composed of small irregular lumps or blocks of emery having the spaces or interstices between them filled with a comparatively-soft metal melting at a comparatively-low temperature, substantially as described.

7. A millstone comprising a skirt with its working face composed of small irregular lumps of emery having the interstices between them filled with a malleable metal which can be consolidated when cold about the blocks or lumps and melting at a comparatively-low temperature.

8. The herein-described improvement in the art of repairing millstones, compris'ng small irregular lumps of emery embedded in a metal melting at a comparatively-low temperature, which consists in inserting a new block of emery into the cavity from which a block has been removed, melting the metal about the block, and adding new metal to firmly secure the new lump to the stone, substantially as described.

In testimony whereof we have hereunto subscribed our names.

THOMAS L. STURTEVANT.
WILLIAM H. ELLIS.

Witnesses:
E. C. HUXLEY,
E. C. McALLISTER.